Dec. 15, 1959     H. P. SORENSEN     2,916,922
MECHANICAL TAPE DRIVE APPARATUS

Filed Nov. 7, 1957     3 Sheets-Sheet 1

INVENTOR.
HAROLD P. SORENSEN
BY
ATTORNEY

Dec. 15, 1959   H. P. SORENSEN   2,916,922
MECHANICAL TAPE DRIVE APPARATUS
Filed Nov. 7, 1957   3 Sheets-Sheet 2

INVENTOR.
HAROLD P. SORENSEN
BY
*Geo. W. Field*
ATTORNEY

Dec. 15, 1959     H. P. SORENSEN     2,916,922
MECHANICAL TAPE DRIVE APPARATUS
Filed Nov. 7, 1957     3 Sheets-Sheet 3
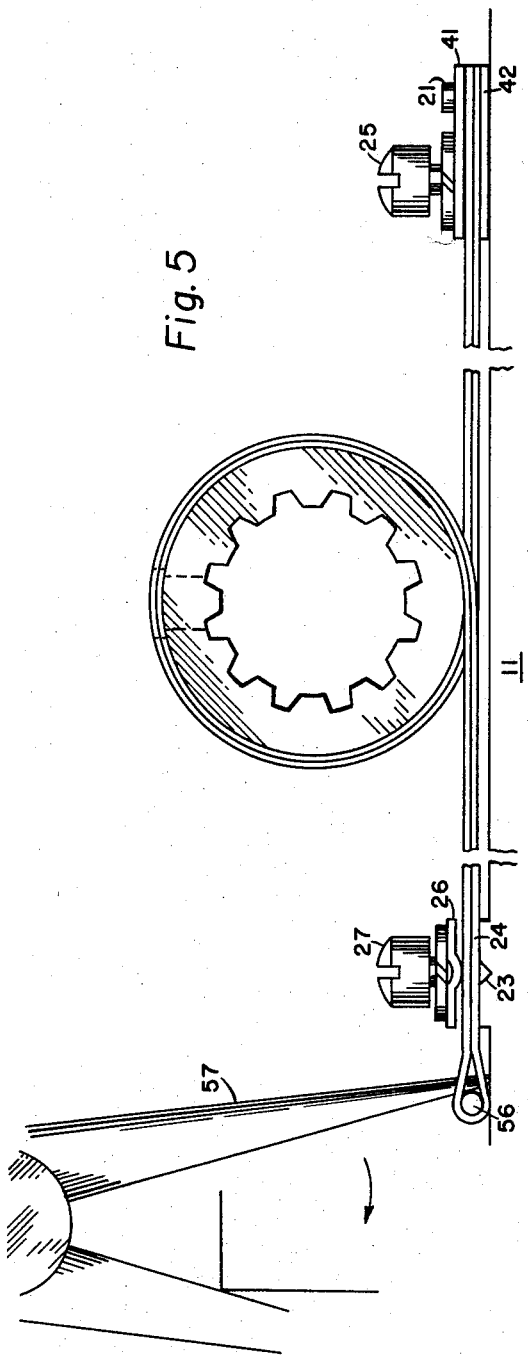
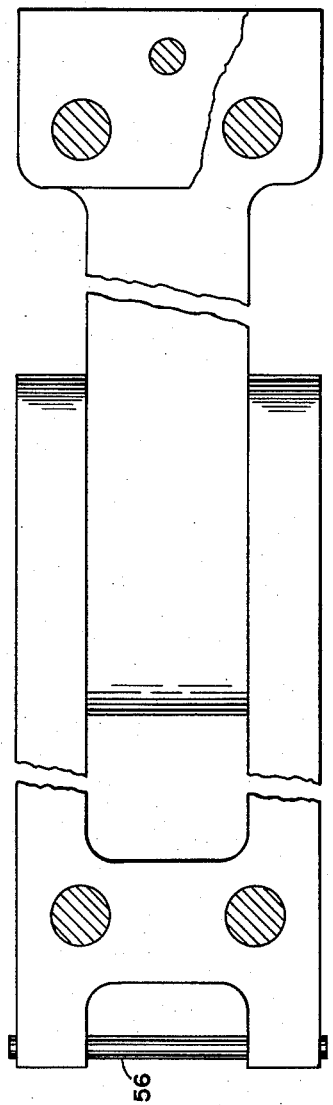
INVENTOR.
HAROLD P. SORENSEN
BY
ATTORNEY

United States Patent Office 2,916,922
Patented Dec. 15, 1959

2,916,922
MECHANICAL TAPE DRIVE APPARATUS

Harold P. Sorensen, Minneapolis, Minn., assignor to Minneapolis-Honeywell Regulator Company, Minneapolis, Minn., a corporation of Delaware Application November 7, 1957, Serial No. 694,996

3 Claims. (Cl. 74—108)

This invention relates to the field of mechanical movements, and has for its object a converter between linear and rotary motion which is free of backlash, which uses the strength of the component materials to best advantage, and which facilitates assemblage of the structure.

Various other objects, advantages, and features of novelty not particularly enumerated above which characterize my invention are pointed out with particularity in the claims annexed hereto and forming a part hereof. However, for a better understanding of the invention, its advantages, and objects obtained by its use, reference should be had to the subjoined drawing, which forms a further part hereof, and to the accompanying descriptive matter, in which I have illustrated and described a preferred embodiment of my invention.

Figure 1:
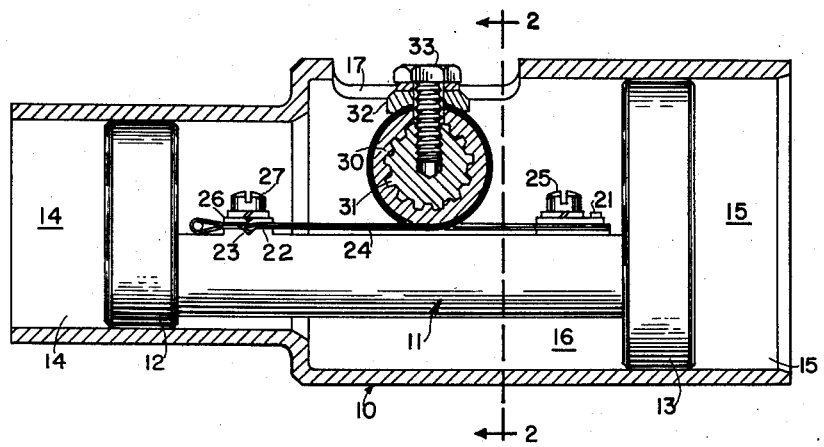
Figure 2:
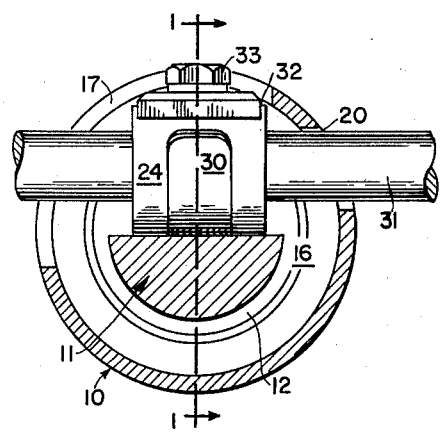
Figure 3:
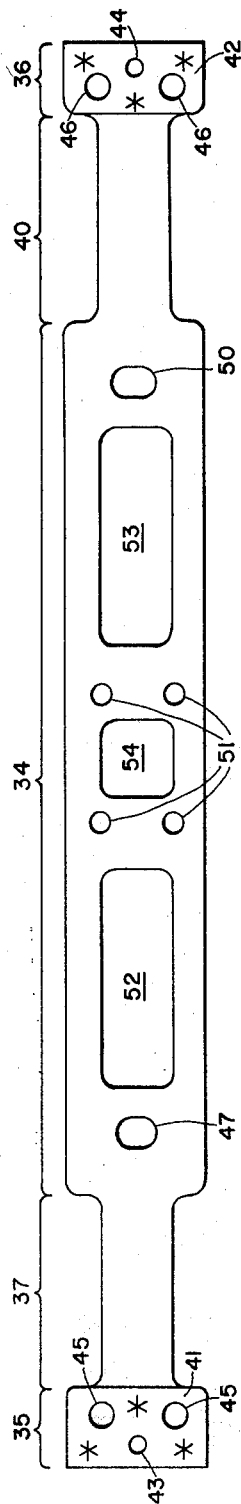
Figure 4:
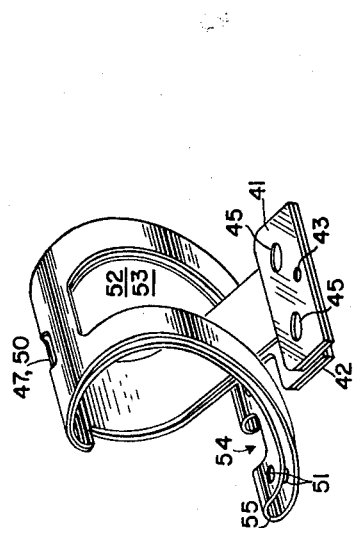

In the drawing Figure 1 is a longitudinal section of a hydraulic cylinder incorporating the invention; Figure 2 is a cross section of the cylinder taken along the line 2—2 of Figure 1; Figure 3 shows a tape element comprised in the invention; Figure 4 is a perspective view showing the tape element prepared for assembly into the complete structure; Figure 5 is an enlarged detailed view resembling Figure 1, and Figure 6 is a bottom view of the showing of Figure 5.

Figure 1 shows a hydraulic structure including a cylinder 10 and a plunger 11. Plunger 11 has pistons 12 and 13 at its opposite ends, piston 13 being of larger diameter than piston 12. Cylinder 10 includes a smaller bore 14 and a larger bore 15 in which pistons 12 and 13 move as a unit in fluid tight relationship. Fluid access to bores 14 and 15 is gained through the respective ends of the cylinder: pistons 12 and 13 define a central space 16 to which fluid access is gained through an aperture 17 in the cylinder wall best shown in Figure 2, which also shows a further aperture 20.

The central portion of plunger 11 is semicircular in cross section, and the upper flattened surface is drilled to receive a dowel pin 21, and is formed with a boss 22 having a V groove 23. A flexible member generally indicated by the reference numeral 24 is fastened to plunger 11 at pin 21 by machine screws 25, and at boss 21 by clamping plate 26 and machine screws 27. Member 24 passes around an internally splined drum 30, and both are fastened on an externally splined shaft 31 by a clamping member 32 and a machine screw 33. Shaft 31 passes through apertures 17 and 20 and is supported at its ends in any suitable bearings not shown, so that its axis lies in a plane perpendicular to the axis of cylinder 10 and is parallel to the plane surface of plunger 11.

Element 24 is shown in Figure 3 to comprise a strip of steel ribbon having a central wider portion 34, terminal wider portions 35 and 36, and intermediate narrower portions 37 and 40. Fastened to terminal portions 35 and 36, as by spot welding, are a pair of reinforcing plates 41 and 42. Holes 43, 44 are formed to pass over dowel pin 21, and holes 45, 46 are provided to receive screws 25.

Central portion 34 is provided with holes 47, 50 to pass screw 33, and with holes 51 to pass screws 27. It is also provided elongated apertures 52 and 53, whose width is slightly greater than the width of intermediate portions 37, 40. A further central aperture 54 is also provided for use in assembling the apparatus. The length of apertures 52 and 53 is the same as the length of intermediate portions 37 and 40, and is greater than the width of portions 35 and 36.

Element 24 is doubled in itself to bring the unreinforced surfaces of the terminal portions into contact. The terminal portions are twisted until they can pass through apertures 52 and 53, and then are allowed to straighten. The element now has the appearance of Figure 4.

The device is assembled as follows. Holes 43 and 44 are aligned and passed over pin 21, and screws 25 are passed through holes 45 and 46 and set down loosely to hold the ends of element 24 to piston 11. Drum 30 is inserted into the loop in element 24. A temporary rod 56 is passed through the doubled portion 55 of element 24, and one jaw 57 of a pair of pliers or other suitable instrument presses against the rod through aperture 54: the other jaw presses against piston 12. Tension is thus produced in element 24: due to the possibility of sliding and rotation of the rod, the tensions in the halves of element 24 on opposite sides of the rod are made equal, and due to the possibility of pivoting about pin 21 unequal tensions in the edges of the tapes are avoided. Screws 27 are now passed through clamping plate 26 and holes 51 in element 24, and are set down tightly. After this the pliers and temporary rod are removed and screws 25 are also set down tightly. In performing this operation care is taken that holes 47, 50 line up with the hole in drum 30 for screw 33.

Plunger 11 is now inserted in cylinder 10, and adjusted longitudinally until shaft 31 may be passed through apertures 17 and 20 and the splined aperture in drum 30. Screw 33 is now passed through clamping plate 32 and holes 47 and 50 and is set down tightly, clamping shaft 31 to drum 32 and clamping member 24 to both.

Now when shaft 31 is set in its bearings, any rotary movement of the shaft results in linear movement of the piston, and any linear displacement of the piston causes rotary movement of the shaft. The arrangement has the advantage of complete absence of backlash, and gives considerably less fiber stress in element 24 than would be the case if a single layer of tape of twice the thickness were used, while the particular method of assembly insures that neither tape will be stressed excessively compared to the other. Figures 5 and 6 are prepared to illustrate the device more clearly as it is being assembled, showing rod 56 and the jaw 57 of the assembling pliers.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. The method of constructing a machine element for interconverting linear and rotary motion which comprises the steps of doubling a flexible metal strip upon itself to produce a pair of superimposed free ends and a loop, pivoting the free ends of said strip to a slidable member at a single first point, wrapping the doubled strip around a rotatable shaft adjacent said member, inserting a traction element in the loop of said double strip, applying force to said traction element to introduce substantially equal tensions into the two layers of said double strip, and fastening the doubled portion of said strip to said sliding member at a second point displaced from said first point while maintaining said tension, so that sliding motion of said member and rotation of said shaft are thereafter concomitant.

2. As an article of manufacture: a shaft mounted for rotation about an axis; a flexible element wrapped around said shaft in driving and driven peripheral relation thereto; a sliding member mounted for reciprocatory motion adjacent said shaft; and means connecting the ends of said flexible element to said sliding member at spaced points thereon to maintain the flexible element in tension around said shaft, said flexible element comprising a metallic strip doubled upon itself to give two overlying layers so that the two ends of the strip comprise one end of said element and the loop in said strip comprises the other end of said element, the maximum fiber stresses in the two layers being substantially equal and the tension in the two layers being substantially equal.

3. As an article of manufacture: a shaft mounted for rotation about an axis; a doubled flexible element, said element forming two overlying layers having substantially equal tension wrapped around said shaft in driving and driven peripheral relation thereto; a sliding member mounted for reciprocatory motion adjacent said shaft; means pivotally connecting both ends of the doubled element to the sliding member at a first point; and means connecting the loop of said doubled flexible element to the sliding member at a second point displaced from said first point in the direction of movement of said member, the maximum fiber stresses in the two layers being substantially equal.

References Cited in the file of this patent
UNITED STATES PATENTS

| 1,135,059 | Scott | Apr. 13, 1915 |
| 1,998,136 | Jaenichen et al. | Apr. 16, 1935 |
| 2,149,216 | Gravley | Feb. 28, 1939 |
| 2,359,636 | Garrity | Oct. 3, 1944 |
| 2,631,359 | Schwartz | Mar. 17, 1953 |